UNITED STATES PATENT OFFICE.

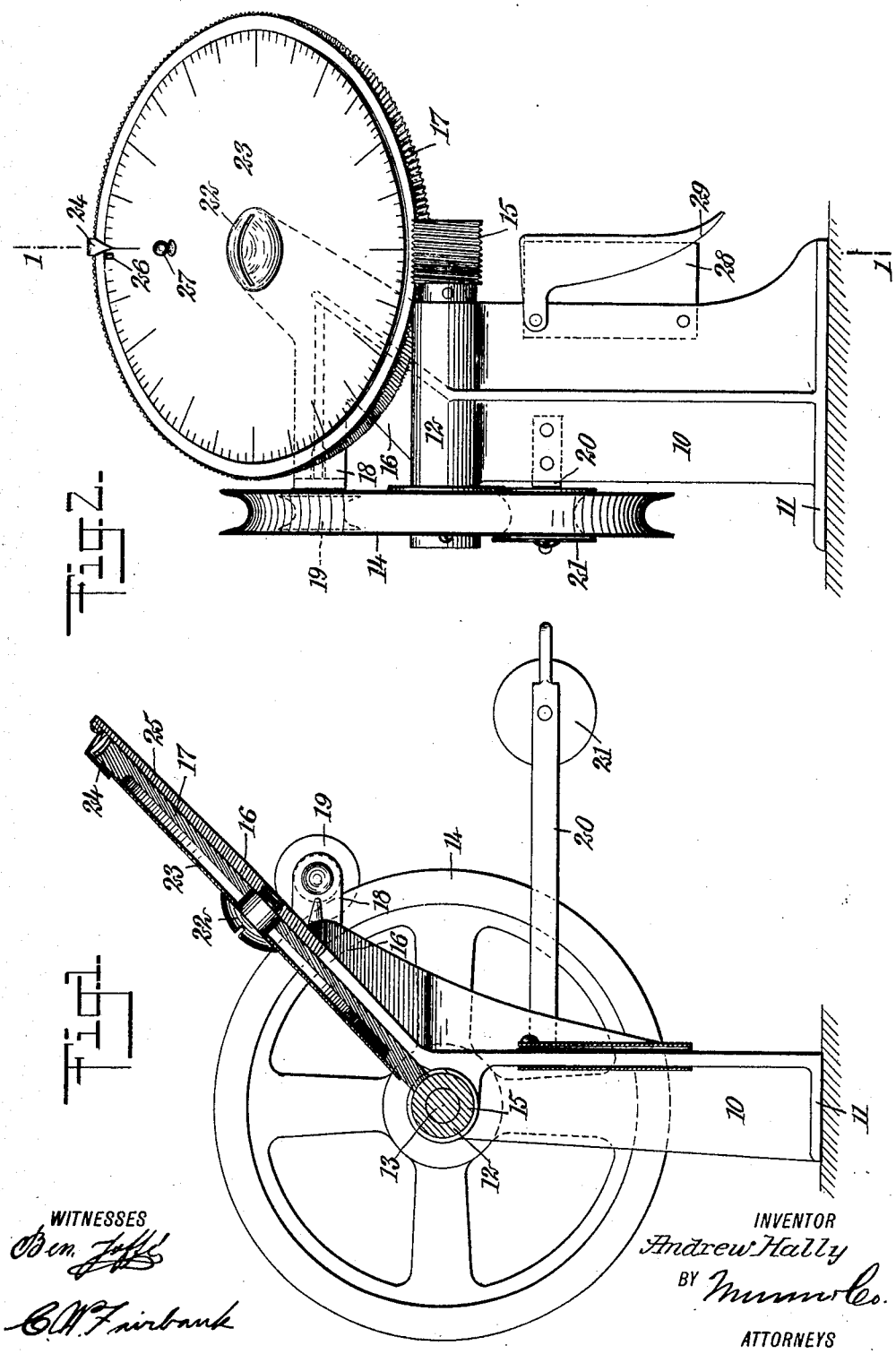

ANDREW HALLY, OF NEW YORK, N. Y.

ROPE-MEASURING MACHINE.

No. 916,148.    Specification of Letters Patent.    Patented March 23, 1909.

Application filed December 31, 1908. Serial No. 470,138.

*To all whom it may concern:*

Be it known that I, ANDREW HALLY, a citizen of the United States, and a resident of the city of New York, borough of the Bronx, in the county and State of New York, have invented a new and Improved Rope-Measuring Machine, of which the following is a full, clear, and exact description.

This invention relates to certain improvements in measuring machines, and more particularly to that type of machine designed for measuring rope or the like, as it is unwound from the spool and sold.

One of the main objects of my invention is to provide certain improvements in the detail mechanism, whereby the dial may be set back to zero without necessitating the rotation of the measuring wheels in the reverse direction.

Reference is to be had to the accompanying drawings, forming a part of this specification, in which similar characters of reference indicate corresponding parts in both the figures, and in which—

Figure 1 is a vertical section through a device constructed in accordance with my invention, said section being taken on the line 1, 1 of Fig. 2; and Fig. 2 is a front view of the device.

My improved measuring device is adapted to be secured adjacent any form of support or reel for rope or other analogous material, and to be so placed that the rope in being unwound from the reel will pass through the device so as to operate the latter.

In the specific form illustrated, I provide a standard 10 having a base 11, by means of which the standard may be rigidly secured in place. At the upper end of the standard is a bearing 12 for a transversely-extending shaft 13 held against longitudinal movement by a large grooved pulley 14 at one end and a small worm 15 at the other end. The standard is provided with a rearwardly and upwardly-extending bracket 16, which has journaled thereto a large worm wheel 17 intermeshing with the worm 15. The rope being measured, passes in contact with the pulley 14 to rotate the latter and more effectively to hold the rope in contact with the wheel the bracket or arm 16 is provided with a branch 18 for supporting a second and smaller pulley 19. The standard supports a rearwardly-extending arm 20, to which is journaled a third pulley 21 for directing the rope to the two main pulleys 14 and 19. The rope passes first over the pulley 21 and then between the pulleys 14 and 19, so as to rotate the latter, and the amount of rope passing in contact with the pulley 14 is indicated by the extent of rotation of the worm wheel 17. The wheel is journaled to the bracket or arm 16 by a screw pivot 22, threaded into the bracket. The wheel is hollowed or dished upon its upper surface, and a dial plate 23 of thin sheet metal is held in contact with the worm wheel by the enlarged head of the screw 22. The dial plate 23 contacts with the wheel about the periphery thereof, but is out of engagement with the wheel over the dished or hollowed out portion of the latter. By tightening the screw 22 to the limiting extent, the center portion of the dial plate is bent inwardly slightly, so that the dial plate frictionally binds the periphery of the wheel although not locked rigid in respect thereto. The frictional engagement is sufficient to cause the rotation of the dial with the wheel. The dial plate is calibrated in accordance with the size and relative proportions of the pulley 14, worm 15 and worm wheel 17 and is preferably calibrated to read in yards, as this is the standard by which most rope and similar material is sold. A stationary pointer 24 extends over the edge of the worm wheel to a point adjacent the periphery of the dial plate, said pointer being supported in any suitable manner, as, for instance, by an extension 25 of the bracket or arm 16. The dial plate carries a small stop 26, which may contact with the pointer 24 when the zero of the dial is adjacent the pointer, and the dial plate may be provided with a small knob 27 by means of which it may be rotated independently of the worm wheel.

In measuring rope or the like, it is drawn in contact with the pulley 14 to rotate the latter, as above indicated, and the rotation of the pulley and worm wheel tends to move the dial in respect to the pointer. The amount of material which has been unwound may be ascertained at any time by an inspection of the dial. The device is preferably used in retailing where it is desirable to set the dial back to zero after each sale. As soon as the number of yards for one customer has been measured off, the dial plate 23 may be moved in respect to the worm wheel by means of the knob 27 and the stop 26 brought back into contact with the pointer 24, so that the device will be ready for a second operation.

In connection with the measuring device, I preferably employ a cutter for subdividing the material after the desired length has been measured off. This cutter preferably comprises a thin sharpened blade 28 secured to the side of the standard and extending outwardly therefrom. A protecting casing 29 is preferably employed in connection with the cutter and pivoted at its upper end, so as to normally protect the cutter against injury, and to protect the operator from accidental contact with the cutter. This casing is provided with an outwardly-extending lower end terminating below the lower end of the cutter, so that when it is desired to sever a piece of rope, it may be merely raised beneath the casing and the latter will swing away from the blade and permit the rope to be moved upwardly over the edge of the latter.

Having thus described my invention, I claim as new and desire to secure by Letters Patent:

1. A rope measuring machine having a pulley adapted to be operated by the rope, a dished wheel rotated by said pulley, a dial plate carried by said dished wheel and frictionally engaging therewith to be rotated thereby, a stationary pointer, and means for rotating said dial plate independently of said wheel.

2. A rope measuring machine, comprising a standard, a transversely-extending shaft carried thereby, a grooved pulley mounted on one end of said shaft, a second grooved pulley adjacent the first-mentioned pulley and serving to hold the rope in engagement with the first-mentioned pulley, a worm upon the opposite end of said shaft, a worm wheel intermeshing with said worm, a dial plate carried by said worm wheel but rotatable in respect thereto, and a stationary pointer carried by said standard and extending over the edge of said worm wheel and terminating adjacent said dial plate.

3. A measuring machine including a pulley, a wheel, means for rotating said wheel by said pulley, said wheel having one surface thereof dished or hollowed, a dial plate concentric with said wheel and covering said dished portion and engaging with the periphery of the wheel, a pivot pin frictionally securing said dial plate to said wheel and constituting the axle or pivot of the wheel, a stationary pointer terminating adjacent the periphery of said dial plate, a stop carried by said dial plate and adapted to contact with said pointer, and a knob carried by said dial plate for rotating the latter independently of the wheel.

In testimony whereof I have signed my name to this specification in the presence of two subscribing witnesses.

ANDREW HALLY.

Witnesses:
CLAIR W. FAIRBANK,
JOHN P. DAVIS.